United States Patent [19]

Quante et al.

[11] Patent Number: 4,570,391
[45] Date of Patent: Feb. 18, 1986

[54] CONNECTOR FOR A FILTER BANK SUPPORTING FRAMEWORK AND METHOD OF ASSEMBLING SAME

[75] Inventors: M. John Quante; Terry W. Cutler, both of Washington, N.C.

[73] Assignee: Flanders Filters, Inc., Washington, N.C.

[21] Appl. No.: 451,198

[22] Filed: Dec. 20, 1982

[51] Int. Cl.$^4$ ............................ G09F 7/18; E04B 5/52
[52] U.S. Cl. .......................................... 52/39; 52/105; 52/283; 52/484; 52/665; 52/741; 52/744; 52/302
[58] Field of Search ................... 52/484, 665, 39, 741, 52/744, 584, 302, 303, 127.4, 105, 283; 55/385 A, 483, 494, 355; 403/266, 267, 268, 292, 14, 170; 405/120, 121

[56] References Cited

U.S. PATENT DOCUMENTS

| | | | |
|---|---|---|---|
| 460,982 | 10/1891 | Moore | 405/121 |
| 971,087 | 9/1910 | Smith | 405/121 |
| 2,080,618 | 5/1937 | Madsen | 52/303 |
| 2,956,652 | 10/1960 | Liskey, Jr. | 52/584 X |
| 3,156,099 | 11/1964 | Dailey | 405/121 |
| 3,418,915 | 12/1968 | Marble | 98/32 |
| 3,486,311 | 12/1969 | Allan, Jr. | 52/484 X |
| 3,785,110 | 1/1974 | Galloway et al. | 52/484 X |
| 4,019,300 | 4/1977 | Saver et al. | 52/665 |
| 4,030,518 | 6/1977 | Wilcox | 137/246 |
| 4,299,508 | 11/1981 | Kerscher et al. | 403/267 X |
| 4,327,051 | 4/1982 | Edmondson | 405/121 X |

FOREIGN PATENT DOCUMENTS

| | | | |
|---|---|---|---|
| 1924139 | 11/1970 | Fed. Rep. of Germany | 405/121 |
| 48117 | 4/1977 | Japan | 52/744 |
| 727934 | 4/1955 | United Kingdom | 405/121 |

Primary Examiner—Alfred C. Perham
Assistant Examiner—Jean M. LaKemper
Attorney, Agent, or Firm—Bell, Seltzer, Park & Gibson

[57] ABSTRACT

An improved connector for a supporting filter bank framework is disclosed which comprises a body member defining at least two extensions radiating from a common central location. Each of the extensions has a U-shaped cross sectional configuration so as to define a bottom wall and two opposite side walls. A threaded coupling member may be disposed at the central location for securing the connector to a supporting tie rod, and a protuberance is disposed within each U-shaped extension at a predetermined distance from the central location. Adjacent connectors are adapted to be joined by an interconnecting channel of predetermined length, with the ends of the channel being positioned within aligned extensions of adjacent connectors, and with the ends of the channels abutting the respective protuberances. A supporting latticework is thereby constructed which defines a plurality of rectangular open areas, and the length and width dimensions of each open area is automatically established. Each extension of each connector further includes a transverse groove extending along the entire inside surface thereof, and an aperture extending through one of the walls and communicating with the groove. A caulking material may be forced through the aperture after the interconnecting channel is secured in the extension, and so that the caulking material is able to flow along the groove and form a seal between the extension and channel. Most of the individual steps involved in the assembly of the latticework may be accomplished as one continuous operation, which avoids the need for repeatedly laying down and picking up the several required tools.

10 Claims, 9 Drawing Figures

CONNECTOR FOR A FILTER BANK SUPPORTING FRAMEWORK AND METHOD OF ASSEMBLING SAME

The present invention relates to an improved supporting framework for a filter bank of a type particularly adapted for use in vertical laminar flow clean rooms, and to a method of assembling the same.

In U.S. Pat. No. 3,486,311 to Allan, which is commonly owned with the present invention, there is disclosed a filter bank assembly for a vertical laminar flow clean room, which comprises a horizontally suspended filter framing latticework composed of corner connectors and a plurality of U-shaped channels extending between the connectors so as to define a plurality of rectangular open areas. A sealing fluid of relatively high consistency is disposed in the channels and connectors, and a high efficiency particulate air (HEPA) filter is adapted to be supported over each rectangular open area of the latticework. Each filter includes a peripheral skirt adapted to be received in the U-shaped channel and the connector so as to form a continuous peripheral seal with the liquid. Most such framing systems define open areas measuring about two feet by four feet, so as to receive a like sized filter. In the case of odd sized rooms, this standard size system may be employed over the majority of the area, while the remaining area is covered by special size filters, filter panels, or spacers.

As will be apparent, the above described latticework must be constructed within close dimensional tolerances in both the length and width dimensions of the open areas to assure proper receipt of the skirt of the filter in the channels. Also, the conventional present method of assembling the bank involves a large number of repetitive and time consuming steps. Specifically, the bank is presently assembled by a method which includes first determining a horizontal plane for the level of the latticework, and marking the level on the four walls of the room by a chalk line or the like. Tie rods are then suspended from the ceiling at each of the intended corners of the latticework, and an X-shaped connector consisting of four radiating U-shaped extensions is attached to each tie rod, so that each connector is in the plane of the chalk line. In addition, L-shaped connectors are mounted in the four corners of the room at the chalk line, and T-shaped connectors are mounted along the walls at the intended corners of the open areas. Once the connectors are in place, the technician begins in one corner of the room and assembles the latticework by placing U-shaped channels between the aligned extensions of adjacent connectors. The assembly is done one connector at a time, with the technician first running a bead of caulking material along each of the U-shaped extensions of the connector, and then positioning a U-shaped channel between the aligned extensions of adjacent connectors. During this process, it is necessary to repeatedly measure the distance between adjacent connectors in both the length and width directions, in order to insure that the permitted tolerances are established. In this regard, such measurement is complicated by the fact that the connectors which are mounted at the ends of the tie rods tend to freely swing.

Once the measurement is completed for a particular connector, the channels are clamped in the extensions of the connector using a suitable clamp. The technician then drills holes through the side walls of the extension and channel (the side walls of the extension preferably being pre-drilled), and pop rivets are installed to maintain their assembly. As a final step, the excess caulking, which is squeezed from between the walls of the connector and channels during the clamping operation, is wiped away. When the assembly of the latticework is completed, the sealing fluid is pumped into the channels, and the filters are thereafter lifted through the open areas and dropped into position into the channels.

From the above description, it will be appreciated that the present assembly procedure is awkward and tedious for the technician, in that it involves the repetitive handling of a number of tools in an overhead position at each connector location. Also, the procedure is very time-consuming, which is aggravated by the repetitive measurements which are required.

It is accordingly an object of the present invention to provide a corner connector for a supporting latticework of a filter bank of the described type and which includes provision for automatically establishing its separation distance from adjacent connectors, and which thereby avoids the necessity for repeated manual measurements by the technician during the assembly procedure.

It is another object of the present invention to provide a corner connector for a latticework of the described type and which further includes provision for greatly simplifying the caulking operation, and wherein all joints in the latticework may be sealed as a single final step of the assembly operation.

It is a further object of the present invention to provide a simplified assembly procedure for a supporting latticework of a filter bank of the described type and which effectively avoids a number of the tedious and repetitive steps of the present procedure.

It is still another object of the present invention to provide a method of assembling a supporting latticework of the described type wherein the length and width dimensions of the rectangular open areas may be readily established, and wherein the repetitive measurements and repeated caulking operations are effectively eliminated.

These and other objects and advantages of the present invention are achieved in the embodiment illustrated herein by the provision of a novel connector which is adapted to form the cornerpieces in a supporting latticework for a filter bank. The connector comprises a body member having at least two extensions radiating at right angles to each other from a central location, with the extensions having a U-shaped cross sectional configuration and with the bottom walls of all of the extensions being coplanar. Abutment means in the form of a protuberance is disposed in the inside of each U-shaped extension and at a predetermined distance from the central location. Thus adjacent connectors are adapted to be joined by an interconnecting channel of predetermined length, with the ends of the channel being positioned within aligned extensions of the adjacent connectors. The protuberances of the aligned extensions are adapted to be engaged by the ends of the interconnecting channel to automatically establish the desired distance between the connectors during the assembly of the latticework. Also, in the preferred embodiment there is provided a transverse groove extending along the entire inside surface of each extension of the connector, and an aperture extends through one of the walls and communicates with the groove. By this arrangement, a caulking material may be forced through the aperture after an interconnecting channel is secured in the extension and so that the caulking material is able to flow along the groove and form a seal between the extension and channel.

The connectors which are adapted to be disposed within the interior of the room are of generally X-shaped configuration, and include four U-shaped extensions radiating from a common central location and at right angles to each other. Also, each such connector includes a coupling member disposed at the central location, with the protuberance being disposed in each of the U-shaped extensions at a predetermined distance from the central coupling member.

In accordance with the method of the present invention, the above described connectors are suspended from an overhead support or ceiling, by means of a tie rod which is interconnected to the coupling member of each connector. A first set of U-shaped channels is provided, with each such channel having a common predetermined length. A second set of U-shaped channels is also provided, which also have a common predetermined length. The length of each of the first set of channels is substantially equal to the distance between the protuberances of the aligned extensions of adjacent connectors along the length direction of the latticework when the connectors are spaced the designed distance in the length direction. Similarly, the length of each of the second set of channels is substantially equal to the distance between the protuberances of the aligned extensions of adjacent connectors along the width direction of the latticework when the connectors are spaced the designed distance in the width direction.

One of the first set of channels is placed between each adjacent pair of connectors along the length direction, with the ends of the channels being received in respective extensions of the connectors and abutting the protuberances therein. One of the second set of channels is similarly positioned between each adjacent pair of connectors along the width direction. Each end of each of the channels is secured to its associated connector, preferably after all of the channels have been placed between the connectors. In this regard, it will be noted that both the length and width dimensions of the rectangular open areas of the latticework will be automatically established within the given design tolerances by the abutment of each channel with the associated protuberances.

As final steps in the method of the present invention, a caulking material may be introduced intermediate each end of each channel and its associated extension to form a seal therebetween, with the caulking step being conducted subsequent to all of the channels having been secured to the extensions of the connectors. The caulking step preferably includes forcing a caulking material through the aperture in the wall of the extension so that the caulking material flows along the groove and between the extension and channel.

Some of the objects having been stated, other objects and advantages will appear as the description proceeds, when taken in connection with the accompanying drawings, in which FIGS. 1-3 are perspective views of a clean room and illustrating some of the method steps involved in assembling a supporting latticework for a vertical laminar flow filter bank in accordance with the present invention;

Figure 1:
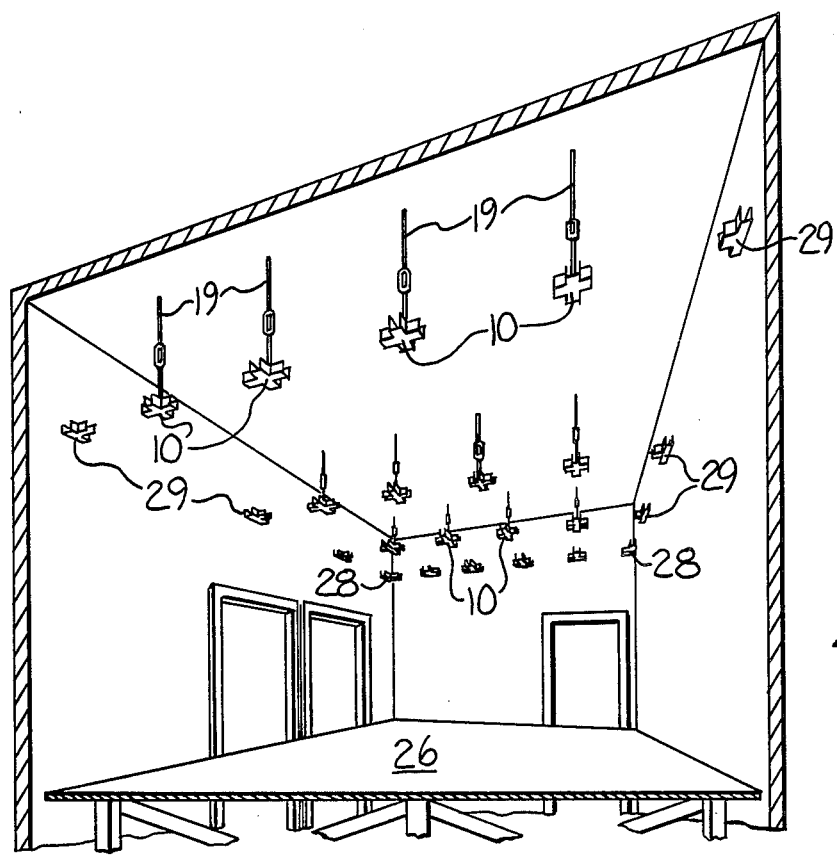

Referring more particularly to the drawings, the illustrated embodiment of the invention includes a connector 10 adapted to be disposed within the interior of a clean room, and which has the general shape of an X in plan view. The connector 10 thus defines four extensions 12 radiating from a common central location, and each of the extensions is of like configuration and has a U-shaped cross sectional configuration so as to define a bottom wall 14 and two opposite side walls 15, 16. The bottom walls 14 of all four extensions are coplanar, and the corresponding side walls of opposite extensions are also coplanar. Further, the open sides of all four extensions are in communication with each other, with no bulkheads therebetween.

The connector 10 is preferably formed of a cast metal such as aluminum, and it includes an integrally formed coupling member 18 disposed at the common central location. The member 18 includes a threaded opening, for securing the connector to a supporting tie rod 19 as seen in the drawings.

Figure 5:
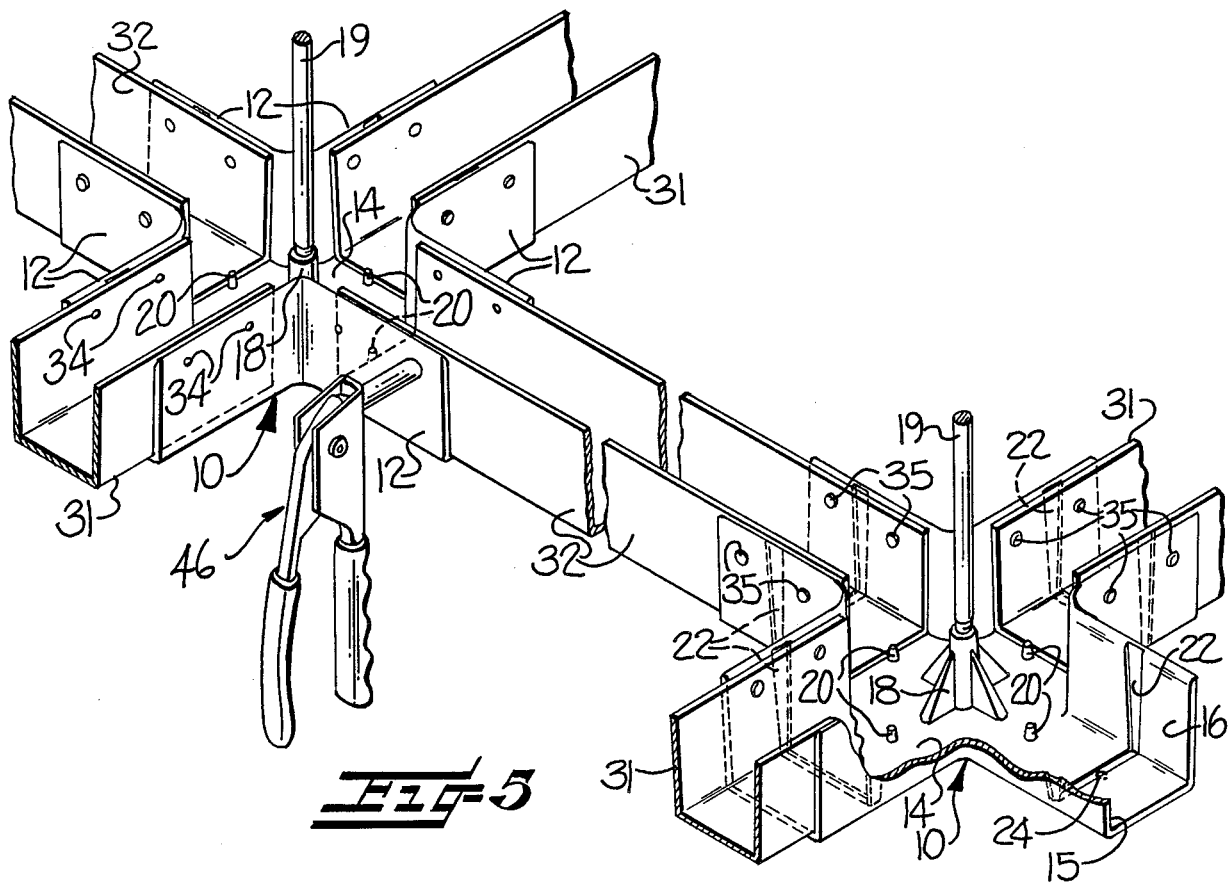
FIG. 5 is a fragmentary perspective view illustrating the step of securing each of the channels to its associated connectors.

Each connector 10 further includes distance indicator means in the form of a protuberance 20 associated with each U-shaped extension at a predetermined distance from the coupling member 18. Each protuberance 20 is preferably integrally formed in the connector, and in the illustrated embodiment, it is positioned adjacent the inner end of the extension on the bottom wall 14 thereof, so as to project upwardly into the channel. In addition, each extension 12 of the connector preferably also includes a transverse groove 22 extending along the entire inside surface of the bottom wall 14 and side walls 15, 16, and the bottom wall 14 includes an aperture 24 communicating with the groove 22. The groove is adapted to receive a caulking material in the manner further described below, and the groove may be tapered along the side walls 15, 16 as best seen in FIG. 5, to reduce the pressure required to force the caulking therealong.

Figure 2:
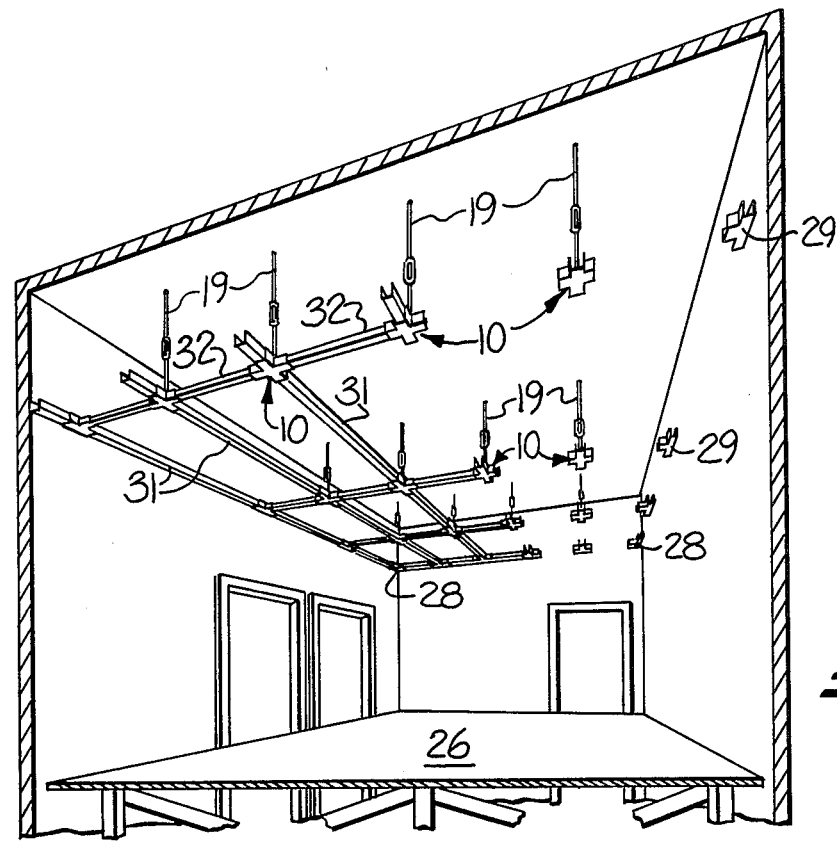
Figure 3:
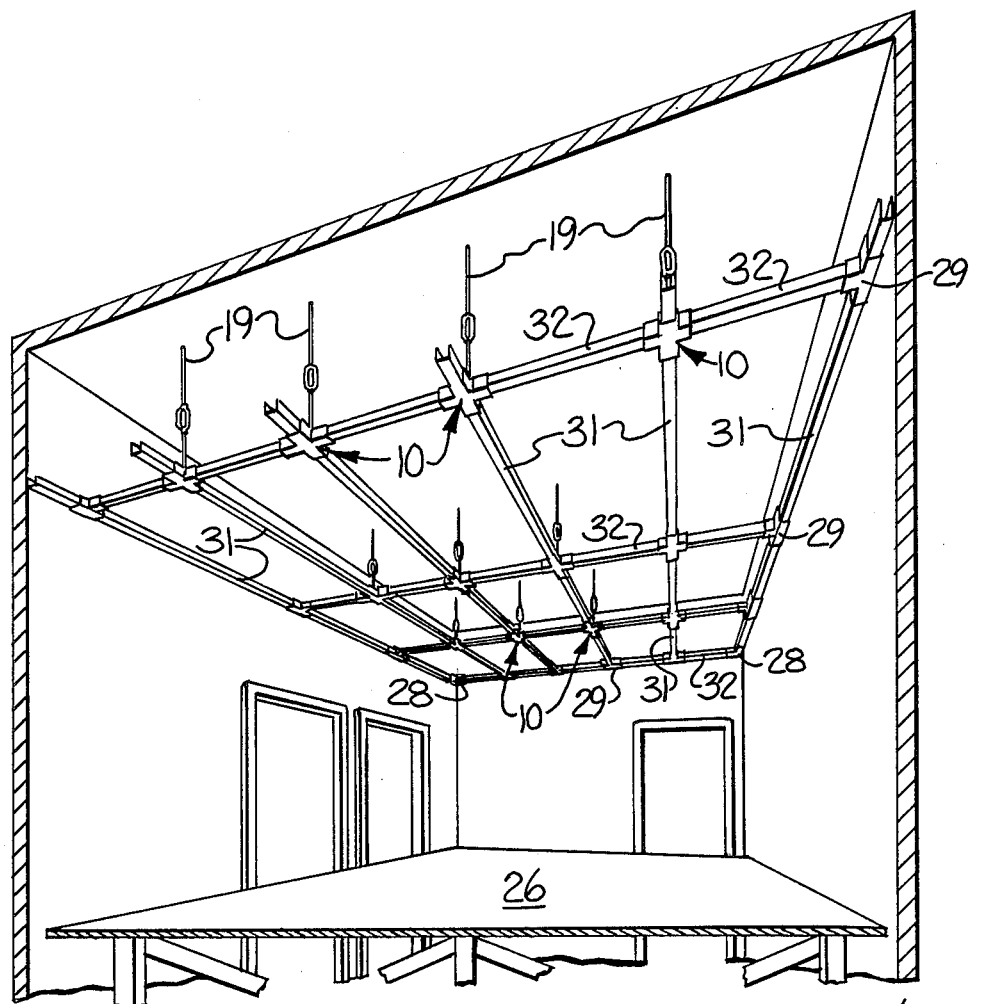

The method of the present invention is best illustrated in FIGS. 1-3. As illustrated in these figures, a temporary platform 26 is initially erected in the room so that the technician may stand on the platform during the assembly procedure. A horizontal plane is then established for the level of the latticework, and the plane is marked on all four walls of the room by a chalk line or the like (not shown). The tie rods 19 are then suspended from the ceiling at each of the intended corners of the latticework within the interior of the room, and the X-shaped connectors 10 are attached to each tie rod by threading the tie rod 19 into the coupling member 18. By suitable adjustment of the length of the tie rods 19, the connectors 10 may be adjusted to lie in the plane of the chalk line.

L-shaped connectors 28 composed of two U-shaped extensions at right angles to each other, are mounted in the four corners of the room at the chalk line. Similarly, T-shaped connectors 29 composed of three U-shaped extensions at right angles to each other are mounted along the walls at the intended corners of the open areas of the latticework. As noted above, the X-shaped connectors 10 are disposed within the interior of the clean room, and the additional connectors 28 and 29 are mounted along the perimeter of the clean room. Thus the connectors 10 will be disposed at the corners of the rectangular open areas within the interior of the resulting latticework (note FIG. 3), and the connectors 28 and 29 will be disposed at the corners of the rectangular open areas about the perimeter of the latticework. Also, as seen in FIG. 1, each extension of the additional connectors 28 and 29 is aligned with an extension of one of the X-shaped connectors 10 or an extension of another of the additional connectors 28 and 29. The extensions of the connectors 28 and 29 are generally similar to the configuration of the extensions 12 of the connector 10, and they include a similar protuberance, transverse groove, and bottom wall aperture. Once all of the connectors 10, 28 and 29 are in place, the technician then places the U-shaped channels 31 and 32 between each adjacent pair of connectors, in both the length and width directions. The channels 31 and 32 may be fabricated from a variety of suitable materials, such as extruded aluminum.

Figure 4:
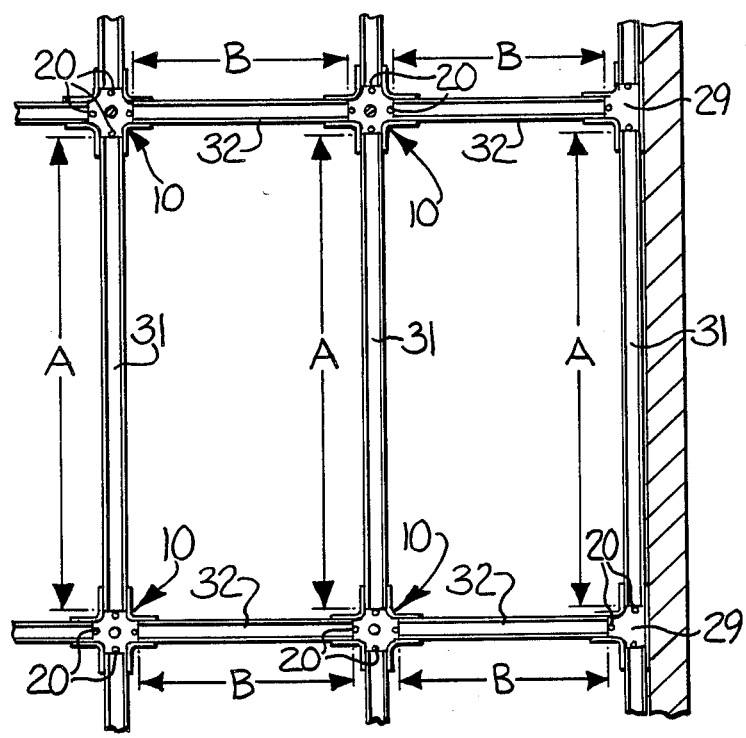
FIG. 4 is a fragmentary top plan view of a portion of the latticework shown in FIG. 3.

As noted above, the dimensions of the filters to be supported by the latticework require that both the length dimension and the width dimension of the open areas be maintained within close dimensional tolerances. By design, the U-shaped channels 31 which are intended to extend in the length dimension between adjacent connectors have a length A (note FIG. 4) which is substantially equal to the distance between the protuberances of the aligned extensions of adjacent connectors along the length direction of the latticework when the connectors are spaced the designed distance in the length direction. Similarly, the channels 32 which are intended to extend in the width direction have a length B which is substantially equal to the distance between the protuberances of the aligned extensions of adjacent connectors along the width direction of the latticework when the connectors are spaced the designed distance in the width direction. Thus when the channels 31, 32 are placed in the extensions, with the ends thereof abutting the two protuberances, the designed length and width dimensions of the open areas will be automatically established.

Once all of the channels have been placed between the aligned extensions, the channels are secured to the extensions by temporarily clamping the members together, drilling a pair of holes 34 through each of the corresponding side walls, and then installing pop rivets or other suitable fasteners 35 therebetween by means of a conventional tool 46, note FIG. 5. Preferably, the extension 12 includes pre-drilled holes in each side wall 15, 16 to facilitate this operation. Also, it is desirable to drill holes which are slightly oversize with respect to the fasteners, to permit limited relative movement between the extension and channel to thereby accommodate expansion or contraction of the latticework which may be caused by temperature changes.

Figure 6:
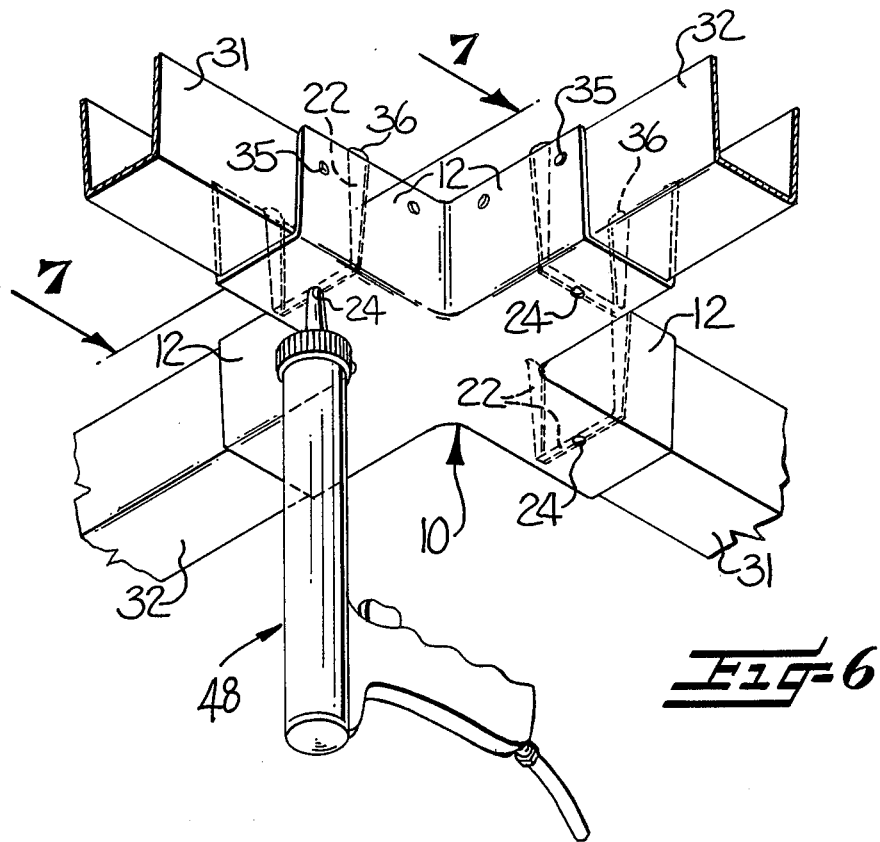
FIG. 6 is a fragmentary perspective view illustrating the step of introducing a caulking material intermediate each end of each channel and its associated extension to form a seal therebetween.
Figure 7:
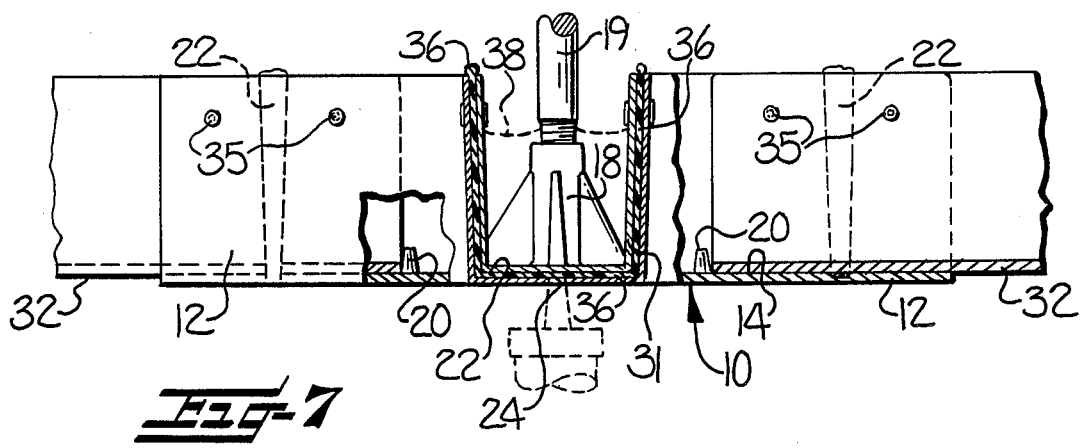
FIG. 7 is a sectional elevation view taken substantially along the line 7—7 of FIG. 6.

When the securing operation is completed for the entire latticework, the technician then caulks each of the joints, by forcing a caulking material 36 through the aperture 24 in the bottom wall of each extension by means of a conventional gun 48, and so that the caulking material flows along the groove 22 and between the extension and channel, note FIG. 6. Any excess caulking material which flows above the upper edge of the extension and channel may be readily wiped away. The caulking material may for example comprise a conventional Silastic material marketed by Dow Chemical Company, and which is sufficiently elastic to maintain an effective seal during limited relative movement of the extension and channel resulting from thermal expansion or contraction. As will be noted, each of the steps of drilling holes in the extensions and channels, installing the fasteners, and caulking, may be accomplished as a single continuous operation for the entire latticework, which avoids the need to repeatedly lay down and pick up the several required tools associated with these operations.

In certain installations, the walls of the room may not be built within the designed tolerances, and the room may for example be slightly out of square, or the walls may bow in or out. To accommodate such error, it is possible to break out or otherwise remove the protuberances 20 in selected extensions, so as to permit the channels to telescope inwardly slightly closer to the coupling member 18. Movement of the channel in the opposite direction is of course possible without removing the protuberance. Typically, the channel may be moved 1/32 inch relative to the connector in either direction from the abutting position, without interfering with the ability to properly receive a filter as described below.

Figure 8:
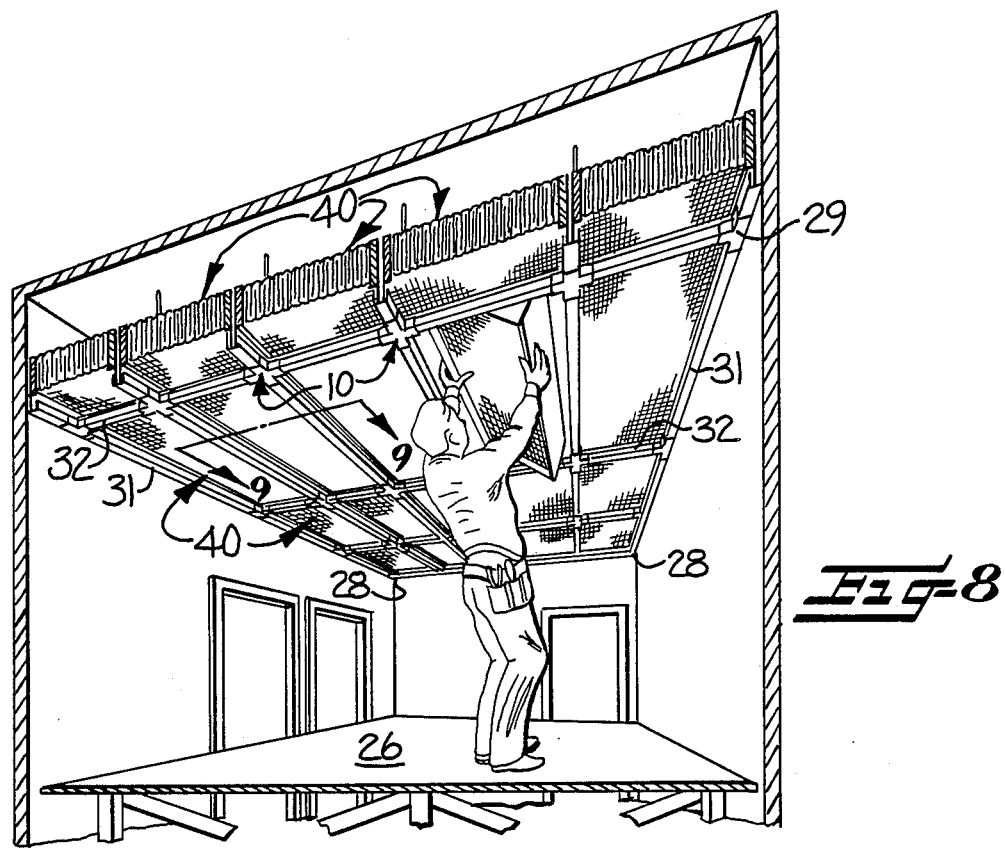
FIG. 8 is a view similar to FIGS. 1-3, and illustrating the step of placing a filter within each open area of the latticework to form a vertical laminar flow clean room.
Figure 9:
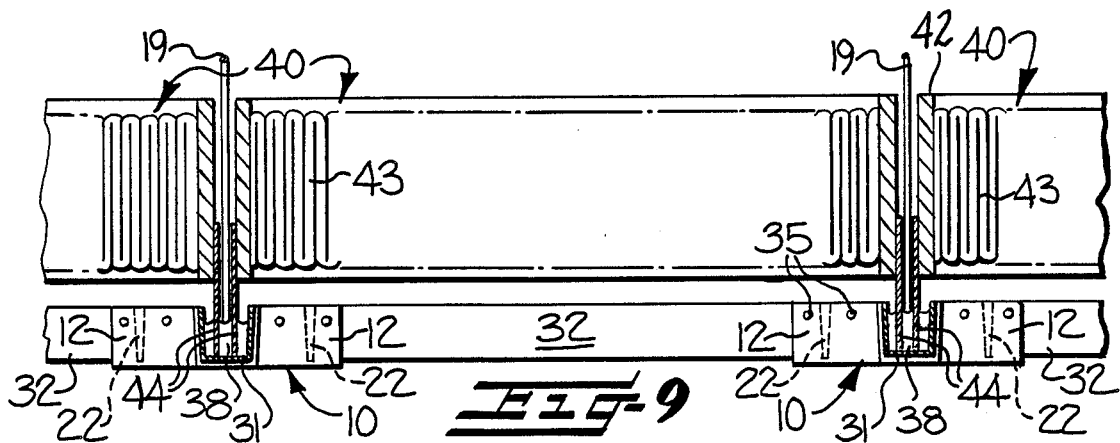
FIG. 9 is a sectional view taken substantially along the line 9—9 of FIG. 8 and illustrating the manner in which a seal is formed between the periphery of each filter and the supporting latticework.

To complete the assembly of a filter bank, a sealing fluid 38, which preferably has a relatively high consistency similar to that of household petrolatum at room temperature, is heated, melted, and pumped into the channels and connectors. Thereafter, a filter 40 is lifted through each open area and dropped onto the latticework. As seen in FIGS. 8 and 9, the filter 40 is rectangular to conform to the size of the open area of the latticework, and it includes a peripheral frame 42 having a pleated filter media 43 mounted therewithin. Also, the forward edge of the frame includes a depending peripheral skirt 44 which is adapted to be received within the fluid filled channel, to form a peripheral seal therebetween.

In the drawings and specification, there has been set forth a preferred embodiment of the invention, and although specific terms are employed, they are used in the generic and descriptive sense only and not for purposes of limitation.

That which is claimed is:

1. A method of assembling a supporting latticework which defines a length and width direction, a plurality of rectangular open areas, and a bounding perimeter, and which is adapted for supporting a filter and the like within each of said open areas, and characterized by the length and width dimensions of the rectangular open areas being readily established within given design tolerances, and comprising the steps of providing a plurality of generally X-shaped connectors, with each connector including four U-shaped extensions radiating from a common central location at right angles to each other, a coupling member disposed at said central location, and protuberance means disposed on each of said U-shaped extensions at a predetermined distance from said coupling member, suspending each of the connectors from an overhead support, and including interconnecting a tie rod with the coupling member of each connector, and with the connectors being disposed at the corners of the intended rectangular open areas in the interior of the latticework, providing a plurality of additional connectors each having a plurality of U-shaped extensions radiating from a central location at right angles to each other, and protuberance means fixedly disposed on each of said U-shaped extensions at a predetermined distance from said central location thereof, mounting each of said additional connectors so as to be disposed at the corners of the intended rectangular open areas about the perimeter of the latticework and with each extension of the additional connectors being aligned with an extension of one of the X-shaped connectors or another of the additional connectors, providing a first set of U-shaped channels each having a common predetermined length, and a second set of U-shaped channels each having a common predetermined length, and with the length of each of the first set of channels being substantially equal to the distance between the protuberance means of the aligned extensions of adjacent connectors along the length direction of the latticework when the connectors are spaced the designed distance in the length direction, and with the length of each of the second set of channels being substantially equal to the distance between the protuberance means of the aligned extensions of adjacent connectors along the width direction of the latticework when the connectors are spaced the designed distance in the width direction, placing one of the first set of channels between each adjacent pair of connectors along the length direction, with the ends of the channels being received in respective extensions of the connectors and abutting the protuberance means thereof, placing one of the second set of channels between each adjacent pair of connectors along the width direction, with the ends of the channels being received in respective extensions of the connectors and abutting the protuberance means thereof, and securing each of the channels to each associated connector.

2. The method as defined in claim 1 including the further step of introducing a caulking material intermediate each end of each channel and its associated extension to form a seal therebetween.

3. The method as defined in claim 2 wherein the caulking step is conducted subsequent to all of the channels having been secured to the associated connectors.

4. The method as defined in claim 3 wherein each connector further includes a transverse groove along the entire inside surface of each extension, and an aperture through the wall of each extension of each connector which communicates with the groove, and wherein the caulking step includes forcing a caulking material through the aperture so that the caulking material flows along the groove and between the extension and channel.

5. The method as defined in claim 1 wherein the securing step is conducted subsequent to all of the channels having been placed between the connectors.

6. The method as defined in claim 5 wherein the securing step includes placing a fastener between the end portion of each channel and its associated extension.

7. A supporting latticework which defines a length and a width direction, a plurality of rectangular open areas, and a bounding perimeter, and which is adapted for supporting a filter and the like within each of the open areas to form a filter bank, and comprising a plurality of generally X-shaped connectors, with each connector including four U-shaped extensions radiating from a common central location at right angles to each other, a coupling member disposed at said central location, and a protuberance fixedly disposed in each of said U-shaped extensions at a predetermined distance from said central location, means engaging said coupling member of each connector and suspending each of the connectors from an overhead support, with the connectors being disposed at the corners of the rectangular open areas in the interior of the latticework, a plurality of additional connector each having a plurality of U-shaped extensions radiating from a central location at right angles to each other, and a protuberance fixedly disposed in each of said U-shaped extensions at a predetermined distance from said central location thereof, means mounting each of said additional connectors so as to be disposed at the corners of the rectangular open areas about the perimeter of the latticework and with each extension of the additional connectors being aligned with an extension of one of the X-shaped connectors or another of the additional connectors, one of a first set of U-shaped channels of common predetermined length being disposed between each adjacent pair of connectors along the length direction, with the ends of the channels being received in respective extensions of the connectors and abutting the protuberances therein, one of a second set of U-shaped channels of common predetermined length being disposed between each adjacent pair of connectors along the width direction, with the ends of the channels being received in respective extensions of the connectors and abutting the protuberances therein, and means securing each of the channels to each associated connector.

8. The supporting latticework as defined in claim 7 wherein each of said X-shaped connectors and each of said additional connectors further includes a transverse groove along the entire inside surface of each extension, and a caulking material positioned within the groove and between the extension and channel.

9. The supporting latticework as defined in claim 8 wherein said channels and connectors are disposed in a horizontal plane with their open sides directed upwardly, and wherein said channels and connectors are substantially filled with a sealing fluid.

10. The supporting latticework as defined in claim 9 wherein each extension of each connector includes an aperture through the wall thereof and communicating with the groove, with the aperture being adapted for permitting entry of the caulking material into the groove after the channel has been secured to its associated connectors.

* * * * *